(12) United States Patent
Yasuda et al.

(10) Patent No.: US 11,466,338 B2
(45) Date of Patent: *Oct. 11, 2022

(54) GRAIN ORIENTED ELECTRICAL STEEL SHEET

(71) Applicant: NIPPON STEEL CORPORATION, Tokyo (JP)

(72) Inventors: Masato Yasuda, Tokyo (JP); Yoshiyuki Ushigami, Tokyo (JP); Masaru Takahashi, Tokyo (JP); Shinya Yano, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 104 days.

This patent is subject to a terminal disclaimer.

(21) Appl. No.: 16/962,753

(22) PCT Filed: Jan. 24, 2019

(86) PCT No.: PCT/JP2019/002265
§ 371 (c)(1),
(2) Date: Jul. 16, 2020

(87) PCT Pub. No.: WO2019/146697
PCT Pub. Date: Aug. 1, 2019

(65) Prior Publication Data
US 2020/0354809 A1    Nov. 12, 2020

(30) Foreign Application Priority Data
Jan. 25, 2018 (JP) .............................. JP2018-010301

(51) Int. Cl.
*B32B 15/00* (2006.01)
*C21D 9/46* (2006.01)
(Continued)

(52) U.S. Cl.
CPC ................ *C21D 9/46* (2013.01); *C21D 3/04* (2013.01); *C21D 6/005* (2013.01); *C21D 6/008* (2013.01);
(Continued)

(58) Field of Classification Search
None
See application file for complete search history.

(56) References Cited

U.S. PATENT DOCUMENTS 3,905,842 A    9/1975  Grenoble
3,905,843 A    9/1975  Fiedler
(Continued)

FOREIGN PATENT DOCUMENTS

EP    0743370 A2    11/1996
JP    1-230721 A    9/1989
(Continued)

OTHER PUBLICATIONS

Written Opinion of the International Searching Authority for PCT/JP2019/002265 (PCT/ISA/237) dated Apr. 23, 2019.

*Primary Examiner* — Seth Dumbris
*Assistant Examiner* — Kim S. Horger
(74) *Attorney, Agent, or Firm* — Birch, Stewart, Kolasch & Birch, LLP

(57) ABSTRACT

A grain oriented electrical steel sheet includes: a base steel sheet; a glass film which is arranged in contact with the base steel sheet; and an insulation coating which is arranged in contact with the glass film and which includes a phosphate and a colloidal silica as main components. The base steel sheet includes the predetermined chemical composition. A BN whose average particle size is 50 to 300 nm is included at a predetermined number density in a region which is from an interface between the glass film and the insulation coating till 5 μm toward the base steel sheet in a depth direction. A (Continued)

B emission intensity obtained inside the glass film is more than a B emission intensity obtained inside the base steel sheet, when a B emission intensity is measured from a surface of the insulation coating by a glow discharge emission spectroscopy.

5 Claims, 1 Drawing Sheet

(51) Int. Cl.
$C21D\ 3/04$ (2006.01)
$C21D\ 6/00$ (2006.01)
$C21D\ 8/00$ (2006.01)
$C21D\ 8/12$ (2006.01)
$C22C\ 38/00$ (2006.01)
$C22C\ 38/02$ (2006.01)
$C22C\ 38/04$ (2006.01)
$C22C\ 38/06$ (2006.01)
$C23C\ 8/26$ (2006.01)
$H01F\ 1/147$ (2006.01)

(52) U.S. Cl.
CPC ............ *C21D 8/005* (2013.01); *C21D 8/1255* (2013.01); *C22C 38/001* (2013.01); *C22C 38/02* (2013.01); *C22C 38/04* (2013.01); *C22C 38/06* (2013.01); *C23C 8/26* (2013.01); *H01F 1/147* (2013.01); *C22C 2202/02* (2013.01)

(56) References Cited

U.S. PATENT DOCUMENTS

| | | |
|---|---|---|
| 4,994,120 A | 2/1991 | Takahashi et al. |
| 5,885,371 A | 3/1999 | Komatsubara et al. |
| 2009/0047537 A1 | 2/2009 | Nanba et al. |
| 2010/0055481 A1 | 3/2010 | Kubo et al. |
| 2012/0103474 A1 | 5/2012 | Ushigami et al. |
| 2012/0111455 A1 | 5/2012 | Ushigami et al. |
| 2013/0292006 A1 | 11/2013 | Takahashi et al. |
| 2018/0002772 A1* | 1/2018 | Han .................. C22C 38/06 |

FOREIGN PATENT DOCUMENTS

| | | |
|---|---|---|
| JP | 1-283324 A | 11/1989 |
| JP | 10-140243 A | 5/1998 |
| JP | 2004-76146 A | 3/2004 |
| JP | 2004-332071 A | 11/2004 |
| JP | 2010-189752 A | 9/2010 |
| JP | 2012-144776 A | 8/2012 |
| JP | 2012-144777 A | 8/2012 |
| JP | 2012-214902 A | 11/2012 |
| KR | 10-1633255 B1 | 7/2016 |
| WO | WO 2008/062853 A1 | 5/2008 |
| WO | WO 2011/007771 A | 1/2011 |
| WO | WO 2011/007817 A1 | 1/2011 |
| WO | WO 2012/096350 A1 | 7/2012 |

* cited by examiner

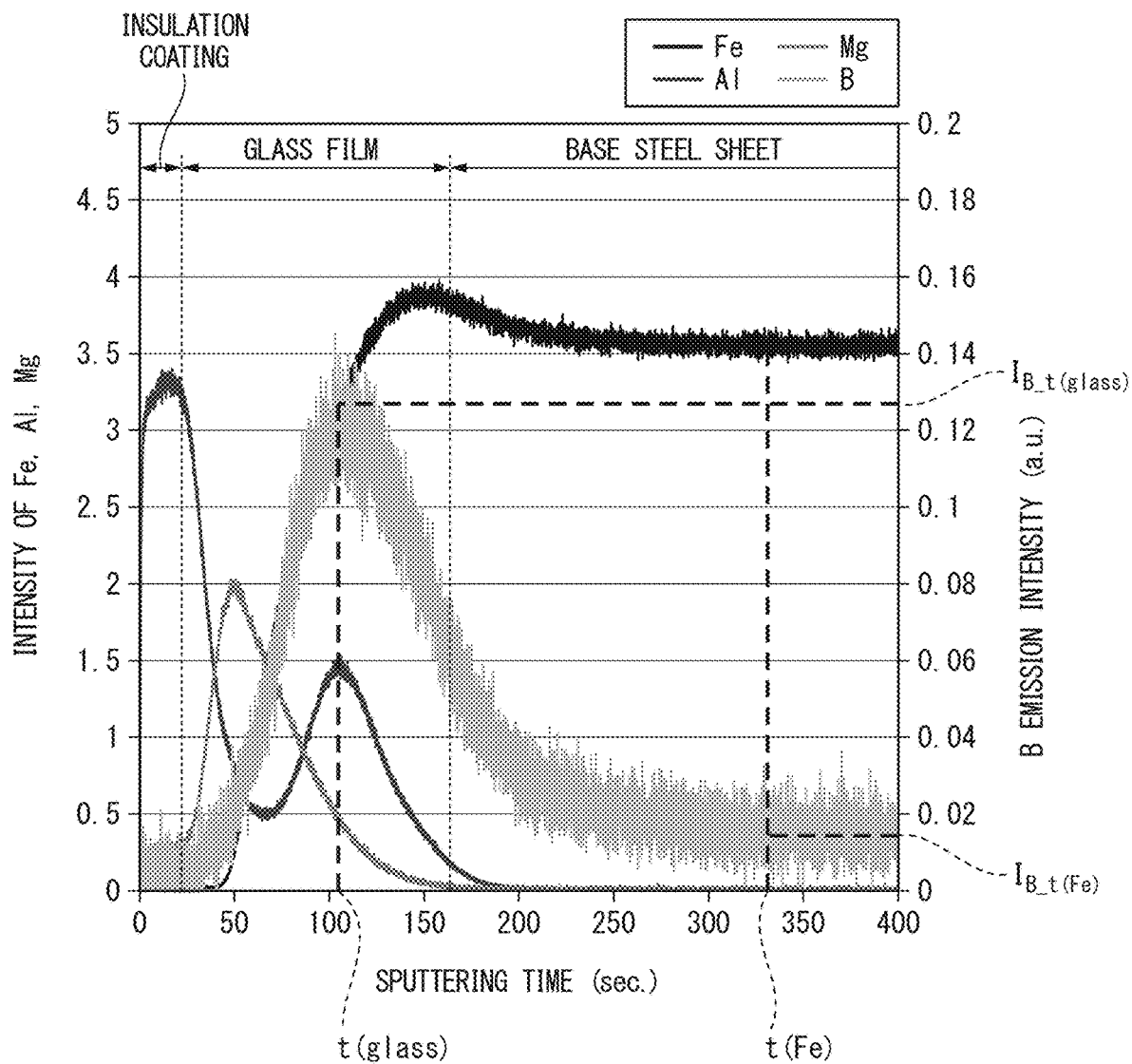

GRAIN ORIENTED ELECTRICAL STEEL SHEET

TECHNICAL FIELD

The present invention relates to a grain oriented electrical steel sheet excellent in coating adhesion, which is used as an iron core material for a transformer or a generator. In particular, the present invention relates to a grain oriented electrical steel sheet excellent in severe bending workability and excellent in productivity of a wound iron core.

Priority is claimed on Japanese Patent Application No. 2018-010301, filed on Jan. 25, 2018, and the content of which is incorporated herein by reference.

BACKGROUND ART

A grain oriented electrical steel sheet is a soft magnetic material and is used for an iron core and the like of electric equipment such as a transformer. The grain oriented electrical steel sheet includes approximately 7 mass % or less of Si and has grains which highly aligns in {110}<001> orientation as miller index. As the characteristics to be satisfied, the grain oriented electrical steel sheet is demanded to show low energy loss, that is, low iron loss, when excited by alternating current.

In recent years, with increasing awareness of global environmental problems such as global warming, the efficiency has been regulated for the transformer which has utilized the grain oriented electrical steel. In particular, the efficiency has been strictly regulated for the wound iron core transformer which has conventionally utilized the low grade grain oriented electrical steel sheet. Thus, the high grade grain oriented electrical steel sheet is beginning to be utilized for the wound iron core transformer. The grain oriented electrical steel sheet is eagerly demanded to reduce the iron loss.

As the characteristics to be satisfied, in addition to (A) low iron loss for the above reasons, the grain oriented electrical steel sheet which is utilized for the wound iron core is demanded to have (B) the characteristic such that a glass film (hereinafter, it may be referred to as the primary coating) does not delaminate when being severely bent. Since the wound iron core is produced by winding the long steel sheet in a coil shape, a radius of curvature becomes low on the inner circumference in the steel sheet, the bending therein becomes severe, and thus, the primary coating tends to be delaminated form the base steel sheet, which is a problem.

In regard to the above (A), in order to reduce the iron loss of the grain oriented electrical steel sheet, it is important to control the orientation of grains, and the orientation is controlled by an abnormal grain growth phenomenon called secondary recrystallization. In order to appropriately control the secondary recrystallization, it is important to appropriately form a structure (primary recrystallized structure) by primary recrystallization before secondary recrystallization and to appropriately control grain boundary segregated elements or fine precipitates called inhibitor.

The inhibitor has functions to suppress growth of grains other than grain having {110}<001> orientation in the primary recrystallized structure and to promote preferential growth of grain having {110}<001> orientation during the secondary recrystallization. Thus, in particular, it is important to control type and amount of the inhibitors.

Many researches have been disclosed regarding the inhibitors. Among them, as a characteristic technique, there is a technique of utilizing B as the inhibitor. For example, the patent documents 1 & 2 disclose that solid-soluted B has the function as the inhibitor and is effective in developing the {110}<001> orientation.

The patent documents 3 and 4 disclose that fine BN is made to form by nitriding a material including B in a process after cold rolling, the formed fine BN acts as the inhibitor, and thereby, the {110}<001> orientation is developed.

The patent document 5 discloses that, although BN is made not to precipitate as much as possible during hot rolling, extremely fine BN is made to precipitate during heating stage of the subsequent annealing, and the formed fine BN acts as the inhibitor.

The patent documents 6 and 7 disclose a method in which, by controlling precipitation morphology of B in hot rolling process, the precipitate is made to act as the inhibitor.

These documents disclose the techniques of adding B as a steel composition and of utilizing B as the inhibitor. These documents disclose that, by the techniques, the {110}<001> orientation is significantly developed after the secondary recrystallization, hysteresis loss is reduced, and thus, the grain oriented electrical steel sheet with low iron loss can be obtained. However, these documents do not disclose the coating adhesion (adhesion between the primary coating and the base steel sheet).

In regard to the above (B), the patent document 8 discloses a method to improve the coating adhesion of forsterite film by controlling the distance t (Sr) of Sr peak position and the distance t (Mg) of Mg peak position from the surface to satisfy t (Sr)≥t (Mg) when the chemical composition is analyzed from the surface to the center in thickness direction, as to the grain oriented electrical steel sheet with the forsterite film including, as the chemical composition, 0.0050% or less of C, 2.0 to 8.0% of Si, 0.005 to 3.0% of Mn, limited to 100 ppm or less of Al, limited to 50 ppm or less of N, limited to 50 ppm or less of S, and limited to 50 ppm or less of Se.

However, the grain oriented electrical steel sheet disclosed in the patent document 8 does not includes the inhibitor components. Moreover, the patent document 8 does not disclose the deterioration in the coating adhesion of the primary coating which occurs when an Al-based inhibitor is used.

Moreover, the patent document 8 does not disclose a method to improve the coating adhesion of the primary coating by combining the technique of using B as the inhibitor (the technique disclosed in the patent documents 1 to 7) and the technique of using the Al-based inhibitor.

As to the improvement of the coating adhesion of grain oriented electrical steel sheet using the Al-based inhibitor, the patent document 9 discloses the grain oriented electrical steel sheet excellent in the coating adhesion which includes 2 to 7% of Si in mass %, has the primary coating including forsterite as main component on the surface of steel sheet, and uses AlN as the inhibitor. In the grain oriented electrical steel sheet disclosed in the patent document 9, the primary coating includes the sulfide compound which contains: at least one element selected from Ca, Sr, or Ba; a rare earth metal element; and sulfur.

The patent document 10 discloses the grain oriented electrical steel sheet excellent in the coating adhesion which has the primary coating including forsterite as main component on the surface, and includes, by mass %, 0.10% or less of C, 1.8 to 7.0% of Si, 0.02 to 0.30% of Mn, 0.001 to 0.04% in total of at least one selected from S and Se, 0.01 to 0.065% of acid soluble Al, 0.0030 to 0.0150% of N, and the balance consisting of Fe and unavoidable impurities. In the grain oriented electrical steel sheet disclosed in the patent document 10, the primary coating includes at least one selected from oxide, hydroxide, sulfate, or carbonate of Ce, La, Pr, Nd, Sc, and Y of 0.1 to 10 mg/m² based on coating weight per one sheet surface in metallic equivalent, and includes Ti of 1 to 800 mg/m² based on coating weight per one sheet surface.

However, the patent documents 9 and 10 whose techniques are based on the Al-based inhibitor do not disclose combination of the technique based on the Al-based inhibitor and the technique based on the B-based inhibitor (the technique disclosed in the patent documents 1 to 7), and utilization of the technique based on the Al-based inhibitor for improving the coating adhesion of the grain oriented electrical steel sheet disclosed in the patent documents 1 to 7.

As described above, in the grain oriented electrical steel sheet in which the base steel sheet includes B, it is demanded to be low iron loss and to be excellent in the coating adhesion of the primary coating.

RELATED ART DOCUMENTS

Patent Documents

[Patent Document 1] U.S. Pat. No. 3,905,842
[Patent Document 2] U.S. Pat. No. 3,905,843
[Patent Document 3] Japanese Unexamined Patent Application, First Publication No. H01-230721
[Patent Document 4] Japanese Unexamined Patent Application, First Publication No. H01-283324
[Patent Document 5] Japanese Unexamined Patent Application, First Publication No. H10-140243
[Patent Document 6] PCT International Publication No. WO2011/007771
[Patent Document 7] PCT International Publication No. WO2011/007817
[Patent Document 8] Japanese Unexamined Patent Application, First Publication No. 2004-076146
[Patent Document 9] Japanese Unexamined Patent Application, First Publication No. 2012-214902
[Patent Document 10] PCT International Publication No. WO2008/062853

SUMMARY OF INVENTION

Technical Problem to be Solved

Among the above mentioned problems, in regard to the coating adhesion of the primary coating in particular, it is demanded to solve the problem such that the primary coating is delaminated at a region severely bended on the inner circumference during producing the transformer (particularly, the wound iron core transformer). It seems that the transformer can be industrially produced with high efficiency by solving the above problem.

The present invention has been made in consideration of the above mentioned situations. An object of the invention is to provide a grain oriented electrical steel sheet which shows low iron loss and excellent in the coating adhesion of the primary coating, in the grain oriented electrical steel sheet utilizing BN as an inhibitor.

Solution to Problem

The present inventors have made an investigation to improve the coating adhesion of the primary coating in the grain oriented electrical steel sheet utilizing BN as the inhibitor. As a result, the present inventors have found that it is important to control the precipitation morphology of B in the steel sheet, in addition to increasing the magnetic flux density by highly aligning the {110}<001> orientation regarding the grains after the secondary recrystallization.

Moreover, the present inventors have found that, in a case where BN is utilized as the inhibitor and precipitates in the entire steel sheet along thickness direction after final annealing, the hysteresis loss increases, the iron loss is hardly reduced, and the coating adhesion deteriorates.

Based on the above findings, the present inventors have made a thorough investigation to solve the above mentioned problems. As a result, the present inventors have found that, by precipitating B as fine BN with the predetermined number density inside the glass film in the grain oriented electrical steel sheet after the final annealing, it is possible to solve the above mentioned problems.

The present invention is made on the basis of the above-described findings. An aspect of the present invention employs the following.

(1) A grain oriented electrical steel sheet according to an aspect of the present invention includes: a base steel sheet; a glass film which is arranged in contact with the base steel sheet; and an insulation coating which is arranged in contact with the glass film and which includes a phosphate and a colloidal silica as main components, wherein the base steel sheet includes: as a chemical composition, by mass %, 0.085% or less of C;
0.80 to 7.00% of Si;
0.05 to 1.00% of Mn;
0.010 to 0.065% of acid soluble Al;
0.012% or less of N;
0.015% or less of Seq=S+0.406·Se;
0.0005 to 0.0080% of B; and
a balance consisting of Fe and impurities, a BN whose average particle size is 50 to 300 nm and whose number density is $2 \times 10^6$ to $2 \times 10^{10}$ pieces/mm³ is included in a region which is from an interface between the glass film and the insulation coating till 5 μm toward the base steel sheet in a depth direction, and a B emission intensity obtained inside the glass film is more than a B emission intensity obtained inside the base steel sheet, when a B emission intensity is measured from a surface of the insulation coating by a glow discharge emission spectroscopy.

(2) In the grain oriented electrical steel sheet according to (1), when an Al emission intensity and an Fe emission intensity are measured by the glow discharge emission spectroscopy, when two peaks observed on an utmost side toward the insulating coating among peaks of the Al emission intensity are referred to as an Al first peak and an Al second peak in turn from the utmost side, when a sputtering time at which the Al second peak is obtained is referred to as t (glass), when a sputtering time at which the Fe emission intensity becomes constant is referred to as t (Fe), when a B emission intensity in the t (glass) is referred to as $I_{B\_t(glass)}$, and when a B emission intensity in the t (Fe) is referred to as $I_{B\_t(Fe)}$, the $I_{B\_t(glass)}$ and the $I_{B\_t(Fe)}$ may satisfy a following expression (1).

$$I_{B\_t(glass)} > I_{B\_t(Fe)} \qquad (1)$$

(3) In the grain oriented electrical steel sheet according to (1) or (2), a ratio of a major axis to a minor axis of the BN may be 1.5 or less.

Effects of Invention

According to the above aspects of the present invention, in the grain oriented electrical steel sheet utilizing the BN as the inhibitor, it is possible to provide the grain oriented electrical steel sheet which shows low iron loss and excellent in the coating adhesion of the primary coating.

BRIEF DESCRIPTION OF DRAWINGS

FIG. 1 is a graph showing the result of conducting GDS analysis to the grain oriented electrical steel sheet according to the invention.

DETAILED DESCRIPTION OF PREFERRED EMBODIMENTS

A grain oriented electrical steel sheet according to an embodiment (hereinafter, it may be referred to as "the present electrical steel sheet") includes: a base steel sheet; a glass film which is formed in contact with the base steel sheet; and an insulation coating which is formed in contact with the glass film and which includes a phosphate and a colloidal silica as main components, wherein the base steel sheet includes: as a chemical composition, by mass %, 0.085% or less of C;
0.80 to 7.00% of Si;
0.05 to 1.00% of Mn;
0.010 to 0.065% of acid soluble Al;
0.012% or less of N;
0.015% or less of Seq=S+0.406·Se;
0.0005 to 0.0080% of B; and
a balance consisting of Fe and impurities, a BN whose average particle size is 50 to 300 nm and whose number density is $2 \times 10^6$ to $2 \times 10^{10}$ pieces/mm$^3$ is included in a surface region of the glass film, and a B emission intensity obtained inside the glass film is more than a B emission intensity obtained inside the base steel sheet, when a B emission intensity is measured from a surface of the insulation coating by a glow discharge emission spectroscopy.

In addition, in the present electrical steel sheet, when an Al emission intensity and an Fe emission intensity are measured by the glow discharge emission spectroscopy, when two peaks observed on an utmost side toward the insulating coating among peaks of the Al emission intensity are referred to as an Al first peak and an Al second peak in turn from the utmost side, when a sputtering time at which the Al second peak is obtained is referred to as t (glass), when a sputtering time at which the Fe emission intensity becomes constant is referred to as t (Fe), when a B emission intensity in the t (glass) is referred to as $I_{B\_t(glass)}$, and when a B emission intensity in the t (Fe) is referred to as $I_{B\_t(Fe)}$, the $I_{B\_t(glass)}$ and the $I_{B\_t(Fe)}$ may satisfy a following expression (1).

$$I_{B\_t(glass)} > I_{B\_t(Fe)} \quad (1).$$

In addition, in the present electrical steel sheet, a ratio of a major axis to a minor axis of the BN may be 1.5 or less.

Hereinafter, the present electrical steel sheet is explained.

Chemical Composition of Base Steel Sheet

Limitation reasons of the chemical composition of the base steel sheet of the present electrical steel sheet are explained. Hereinafter, unless otherwise noted, "%" of the chemical composition represents "mass %".

0.085% or Less of C

C is an element effective in controlling the primary recrystallized structure, but negatively affective in the magnetic characteristics. Thus, C is the element to be removed by decarburization annealing before final annealing. When the C content is more than 0.085%, a time for decarburization annealing needs to be prolonged, and the productivity decreases, which is not preferable. The C content is preferably 0.070% or less, and more preferably 0.050% or less.

Although the lower limit of C includes 0%, the producing cost drastically increases in order to reduce C to be less than 0.0001%. Thus, the lower limit of C is substantially 0.0001% as practical steel sheet.

0.80 to 7.00% of Si

Si is an element which increases the electric resistance of steel sheet and improves the iron loss characteristics. When the Si content is less than 0.80%, γ transformation occurs during the final annealing and the crystal orientation of steel sheet is impaired, which is not preferable. The Si content is preferably 1.50% or more, and more preferably 2.50% or more.

On the other hand, when the Si content is more than 7.00%, the workability deteriorates and the cracks occur during rolling. Thus, the Si content is to be 7.00% or less. The Si content is preferably 5.50% or less, and more preferably 4.50% or less.

0.05 to 1.00% of Mn

Mn is an element to suppress the cracks during hot rolling and to form MnS and/or MnSe which act as the inhibitor by bonding to S and/or Se. When the Mn content is less than 0.05%, the effect of addition is not sufficiently obtained, which is not preferable. The Mn content is preferably 0.07% or more, and more preferably 0.09% or more.

On the other hand, when the Mn content is more than 1.00%, the dispersion state of precipitation of MnS and/or MnSe becomes uneven, the desired secondary recrystallized structure cannot be obtained, and the magnetic flux density decreases, which is not preferable. The Mn content is preferably 0.80% or less, and more preferably 0.60% or less.

0.010 to 0.065% of Acid Soluble Al

The acid soluble Al is an element to form (Al, Si)N which acts as the inhibitor by bonding to N. When the amount of acid soluble Al is less than 0.010%, the effect of addition is not sufficiently obtained, the secondary recrystallization does not proceed sufficiently, which is not preferable. The amount of acid soluble Al is preferably 0.015% or more, and more preferably 0.020% or more.

On the other hand, when the amount of acid soluble Al is more than 0.065%, the dispersion state of precipitation of (Al, Si)N becomes uneven, the desired secondary recrystallized structure cannot be obtained, and the magnetic flux density decreases, which is not preferable. The amount of acid soluble Al is preferably 0.050% or less, and more preferably 0.040% or less.

0.012% or Less of N

Since a risk of iron loss deterioration due to the formation of nitrides may increase, the N content is to be 0.012% or less. The N content is preferably 0.010% or less, and more preferably 0.009% or less.

As described later, N as the slab composition is an element to form AlN which acts as the inhibitor by bonding to Al. However, N is also an element to form blisters (voids) in the steel sheet during cold rolling. Although the N content is not particularly limited, when the N content is less than 0.004%, the formation of AlN becomes insufficient, which is not preferable. Thus, the lower limit of N content may be 0.004% or more. The N content is preferably 0.006% or more, and more preferably 0.007% or more.

0.015% or Less of Seq=S+0.406·Se

As described later, S and Se as the slab composition are elements to form MnS and/or MnSe which acts as the inhibitor by bonding to Mn. The content thereof is specified by Seq=S+0.406·Se in consideration of the atomic weight ratio of S and Se.

Since the iron loss may deteriorate due to the formation of sulfide, the Seq is to be 0.015% or less. The Seq is preferably 0.013% or less, and more preferably 0.011% or less.

Although the lower limit of Seq is not particularly limited, when the Seq is less than 0.003%, the effect of addition is not sufficiently obtained. Thus, the Seq is to be 0.003% or more. The Seq is preferably 0.005% or more, and more preferably 0.007% or more.

0.0005 to 0.0080% of B

B is an element to form BN which acts as the inhibitor by bonding to N and by complexly precipitating with MnS or MnSe.

When the B content is less than 0.0005%, the effect of addition is not sufficiently obtained, which is not preferable. The B content is preferably 0.0010% or more, and more preferably 0.0015% or more. On the other hand, when the B content is more than 0.0080%, the dispersion state of precipitation of BN becomes uneven, the desired secondary recrystallized structure cannot be obtained, and the magnetic flux density decreases, which is not preferable. The B content is preferably 0.0060% or less, and more preferably 0.0040% or less.

In the base steel sheet, the balance excluding the above elements is Fe and impurities. The impurities correspond to elements which are unavoidably contaminated from raw materials of the steel and/or from production processes. In the present electrical steel sheet, the impurities are acceptable when they are contained within a range that does not deteriorate the characteristics.

For example, the present electrical steel sheet may include, as the impurities, at least one selected from the group consisting of 0.30% or less of Cr, 0.40% or less of Cu, 0.50% or less of P, 1.00% or less of Ni, 0.30% or less of Sn, 0.30% or less of Sb, and 0.01% or less of Bi.

Glass Film

In the grain oriented electrical steel sheet according to the present embodiment, the glass film is formed in contact with the base steel sheet. The glass film includes complex oxides such as forsterite ($Mg_2SiO_4$). The glass film is formed during final annealing as described below, in which an oxide layer including silica as a main component reacts with an annealing separator including magnesia as a main component.

Morphology and Effect of BN

Average Particle Size of BN: 50 to 300 nm

When BN with the particle size of 50 to 300 nm is included inside the glass film, the coating adhesion of the primary coating is improved. The above reason is not clear, but is considered that the coating adhesion is improved because the morphology of the anchor part of the glass film (forsterite film) is changed when BN is included inside the glass film (forsterite film) which mainly composes of $Mg_2SiO_4$. In the present embodiment, the average particle size of BN is to be 50 to 300 nm.

The glass film has a three dimensional intruding structure at the interface with the base steel sheet. The above "inside the glass film" indicates a region which is from an outermost surface of the glass film (namely, an interface between the glass film and the insulation coating) till 5 μm toward the base steel sheet in a depth direction. Since the thickness of the glass film is generally 1 to 5 μm, the above "inside the glass film" may include the base steel sheet in addition to the glass film.

Since BN is re-precipitated after being solid-soluted, the shape thereof tends to be spherical in order to reduce the surface energy. Thus, BN is preferably spherical. In the present embodiment, "spherical BN" indicates BN of which a ratio of a major axis to a minor axis is 1.5 or less.

Although BN with the particle size of 300 nm or more may be included, when the coarse BN is excessively included, the frequency of precipitation decreases and the improvement effect of the coating adhesion is not sufficiently obtained. Thus, the average particle size of BN is to be 300 nm or less. The average particle size of BN is preferably 280 nm or less, and more preferably 260 nm or less.

When the particle size of BN is 50 nm or less, the frequency of precipitation increases and the iron loss increases. Thus, the average particle size of BN is to be 50 nm or more. The average particle size of BN is preferably 80 nm.

Number Density of BN: $2 \times 10^6$ to $2 \times 10^{10}$ Pieces/mm$^3$

The number density of BN whose average particle size is 50 to 300 nm is to be $2 \times 10^6$ to $2 \times 10^{10}$ pieces/mm$^3$ inside the glass film.

When the number density of BN is less than $2 \times 10^6$ pieces/mm$^3$, the dispersion of BN inside the glass film becomes insufficient and the improvement effect of the coating adhesion is not sufficiently obtained, which is not preferable. The number density of BN is preferably $3 \times 10^6$ pieces/mm$^3$ or more.

The upper limit of the number density of BN is to be $2 \times 10^{10}$ pieces/mm$^3$ from the perspective of deterioration of iron loss.

The number density of BN is measured as follows. The grain oriented electrical steel sheet (final product) is cleaned by sodium hydroxide, the insulating coating of the surface of steel sheet is removed, the surface of steel sheet is observed by FE-SEM, and thereby, the number density of BN is determined. It is possible to determine the number density of BN by taking 10 micrographs in which each visual field is 4 μm in the width direction and 2 μm in the thickness direction and by counting the number of BN on the surface of the steel sheet.

B emission intensity $I_B$ measured by GDS: a B emission intensity obtained inside the glass film is larger than a B emission intensity obtained inside the base steel sheet In B distribution in the depth direction of the steel sheet, when the B concentration (intensity) inside the glass film is less than the B concentration (intensity) inside the base steel sheet, the coating adhesion deteriorates because BN is not precipitated or only small amount of BN is precipitated inside the glass film. In addition, when the fine BN is included inside the base steel sheet, the iron loss deteriorates.

In the grain oriented electrical steel sheet according to the present embodiment, when a B emission intensity is measured by a glow discharge emission spectroscopy from the surface of the insulating coating, the B emission intensity obtained inside the glass film is more than the B emission intensity obtained inside the base steel sheet. In the present embodiment, by the above feature, it is possible to obtain the grain oriented electrical steel sheet which shows low iron loss and excellent in the coating adhesion.

Preferably, in the grain oriented electrical steel sheet according to the present embodiment, in addition to the B emission intensity, an Al emission intensity and an Fe emission intensity are measured by the glow discharge emission spectroscopy from the surface of the insulating coating. When the t (glass) is defined as a sputtering time to reach the inside of the glass film from starting the measurement, when the t (Fe) is defined as a sputtering time to reach the inside of the base steel sheet from starting the measurement, and when the B emission intensity $I_{B\_t(glass)}$ in the t (glass) and the B emission intensity $I_{B\_t(Fe)}$ in the t (Fe) satisfy the following expression (1), it is indicated that BN is sufficiently precipitated inside the glass film. Thus, by satisfying the following expression (1), it is possible to ensure low iron loss and excellent in the coating adhesion.

$$I_{B\_t(glass)} > I_{B\_t(Fe)} \tag{1}$$

In some cases, the sputtering time to reach the glass film may be judged by the time at which the Mg peak is observed in the GDS measurement. The above reason is because the glass film is mainly composed of forsterite ($Mg_2SiO_4$). Thus, the depth position where the glass film exists corresponds to the depth position (sputtering time) where the Mg peak is observed. However, since the glass film is changed depending on the production conditions, the time (position) when the Mg peak is observed may shift. Thus, in the present embodiment, it is preferable that the depth position of the glass film is judged by the Al peak. Al is derived from spinel ($MgAl_2O_4$) which precipitates at the interface between the glass film and the base steel sheet, and it is possible to most certainly judge whether reaching the glass film or not, by using the time to reach Al being included at the interface between the glass film and the base steel sheet. The above feature can be identified by GDS measurement. When the emission intensities of Fe, Al, Mg, and B are measured by GDS, the time at which the Al second peak is obtained is referred to as t (glass), and it is judged to reach the inside of the glass film at the time.

Moreover, it is possible to define the t (Fe) which is the sputtering time to reach the inside of the base steel sheet by using the time at which the Fe emission intensity becomes constant. The fact that the Fe emission intensity becomes constant indicates that the depth position thereat is certainly located inside the base steel sheet.

FIG. 1 is a graph showing the result of conducting GDS analysis to the grain oriented electrical steel sheet according to the invention. As shown in FIG. 1, when the GDS analysis is conducted from the surface of the insulating coating in the grain oriented electrical steel sheet according to the present embodiment, the two peaks of Al are measured in the insulation coating and in the glass film. Herein, the Al peak observed in the insulation coating is referred to as the Al first peak, and the Al peak observed in the glass film is referred to as the Al second peak. As described above, in the present embodiment, the t (glass) is defined as the time at which the emission intensity of Al becomes maximum in the Al second peak. In the instance shown in FIG. 1, the t (glass) is 106 seconds.

Moreover, as shown in FIG. 1, the time (depth position, approximately 25 seconds in FIG. 1) at which the Mg peak inflects is defined as the interface between the insulation coating and the glass film, and the time (depth position, approximately 150 seconds in FIG. 1) at which the Mg emission intensity becomes zero is defined as the interface between the glass film and the base steel sheet. Herein, although the Mg emission intensity is slightly detected during the sputtering time of 0 to 25 seconds, it seems that the above Mg emission intensity is derived from Mg diffusing to the insulation coating. Thus, the depth position thereat is judged not to be at the glass film but to be at the insulation coating.

Moreover, in the present embodiment, the time at which the Fe emission intensity becomes constant is referred to as t (Fe). In the instance shown in FIG. 1, the t (Fe) is 325 seconds. Herein, the above "the Fe emission intensity becomes constant" does not indicate the time at which the Fe emission intensity starts to become constant, but indicates the time at which the Fe emission intensity becomes constant and stable. For example, in the present embodiment, the above "the Fe emission intensity becomes constant" is judged whether or not the change of the Fe emission intensity is within 0.5 per 50 seconds. When the above change becomes within 0.5, the end time of the 50 seconds thereat is defined as t (Fe).

Moreover, in order to appropriately control the particle size, the frequency of precipitation, and the distribution of BN, it is needed to appropriately control the cooling rate in purification annealing after final annealing. The details thereof are described later.

Insulation Coating

In the grain oriented electrical steel sheet according to the present embodiment, the insulation coating is formed in contact with the glass film and includes phosphate and colloidal silica as main components.

Next, a method of producing the grain oriented electrical steel sheet according to the present embodiment will be described.

Composition of Silicon Steel Slab

In the present electrical steel sheet, the silicon steel slab includes: as a chemical composition, by mass %, 0.085% or less of C; 0.80 to 7.00% of Si; 0.05 to 1.00% of Mn; 0.010 to 0.065% of acid-soluble Al; 0.004 to 0.012% of N; 0.01% or less of S; and 0.0005 to 0.0080% of B.

0.085% or Less of C

C is an element effective in controlling the primary recrystallized structure, but negatively affective in the magnetic characteristics. Thus, C is the element to be removed by decarburization annealing before final annealing. When the C content is more than 0.085%, a time for decarburization annealing needs to be prolonged, and the productivity decreases. Thus, the C content is to be 0.085% or less. The C content is preferably 0.070% or less, and more preferably 0.050% or less.

Although the lower limit of C includes 0%, the producing cost drastically increases in order to reduce C to be less than 0.0001%. Thus, the lower limit of C is substantially 0.0001% as practical steel sheet. In the grain oriented electrical steel sheet, C is generally reduced to approximately 0.001% or less in decarburization annealing.

0.80 to 7.00% of Si

Si is an element which increases the electric resistance of steel sheet and improves the iron loss characteristics. When the Si content is less than 0.80%, γ transformation occurs during the final annealing and the crystal orientation of steel sheet is impaired. Thus, the Si content is to be 0.80% or more. The Si content is preferably 1.50% or more, and more preferably 2.50% or more.

On the other hand, when the Si content is more than 7.00%, the workability deteriorates and the cracks occur during rolling. Thus, the Si content is to be 7.00% or less. The Si content is preferably 5.50% or less, and more preferably 4.50% or less.

0.05 to 1.00% of Mn

Mn is an element to suppress the cracks during hot rolling and to form MnS which act as the inhibitor by bonding to S and/or Se. When the Mn content is less than 0.05%, the effect of addition is not sufficiently obtained. Thus, the Mn content is to be 0.05% or more. The Mn content is preferably 0.07% or more, and more preferably 0.09% or more.

On the other hand, when the Mn content is more than 1.00%, the dispersion state of precipitation of MnS becomes uneven, the desired secondary recrystallized structure cannot be obtained, and the magnetic flux density decreases. Thus, the Mn content is to be 1.00% or less. The Mn content is preferably 0.80% or less, and more preferably 0.06% or less.

0.010 to 0.065% of Acid Soluble Al

The acid soluble Al is an element to form (Al, Si)N which acts as the inhibitor by bonding to N. When the amount of acid soluble Al is less than 0.010%, the effect of addition is not sufficiently obtained, the secondary recrystallization does not proceed sufficiently. Thus, the amount of acid soluble Al is to be 0.010% or more. The amount of acid soluble Al is preferably 0.015% or more, and more preferably 0.020% or more.

On the other hand, when the amount of acid soluble Al is more than 0.065%, the dispersion state of precipitation of (Al, Si)N becomes uneven, the desired secondary recrystallized structure cannot be obtained, and the magnetic flux density decreases. Thus, the amount of acid soluble Al is to be 0.065% or less. The amount of acid soluble Al is preferably 0.050% or less, and more preferably 0.040% or less.

0.004 to 0.012% of N

N is an element to form AlN which acts as the inhibitor by bonding to Al. However, N is also an element to form blisters (voids) in the steel sheet during cold rolling. When the N content is less than 0.004%, the formation of AlN becomes insufficient. Thus, the N content is to be 0.004% or more. The N content is preferably 0.006% or more, and more preferably 0.007% or more.

On the other hand, when the N content is more than 0.012%, the blisters (voids) may be formed in the steel sheet during cold rolling. Thus, the N content is to be 0.012% or less. The N content is preferably 0.010% or less, and more preferably 0.009% or less.

0.01% or Less of S

S is an element to form MnS which acts as the inhibitor by bonding to Mn.

When the S content is more than 0.01%, the dispersion state of precipitation of MnS becomes uneven after purification annealing, the desired secondary recrystallized structure cannot be obtained, the magnetic flux density decreases, the hysteresis loss increases. When MnS remains after purification annealing, the hysteresis loss increases.

The lower limit thereof is not particularly limited. The S content is preferably 0.003% or more, and more preferably 0.007% or more.

0.0005 to 0.0080% of B

B is an element to form BN which acts as the inhibitor by bonding to N and by complexly precipitating with MnS.

When the B content is less than 0.0005%, the effect of addition is not sufficiently obtained. Thus, the B content is to be 0.0005% or more. The B content is preferably 0.0010% or more, and more preferably 0.0015% or more. On the other hand, when the B content is more than 0.0080%, the dispersion state of precipitation of BN becomes uneven, the desired secondary recrystallized structure cannot be obtained, and the magnetic flux density decreases. Thus, the B content is to be 0.0080% or less. The B content is preferably 0.0060% or less, and more preferably 0.0040% or less.

In the silicon steel slab, the balance excluding the above elements is Fe and unavoidable impurities. The impurities correspond to elements which are unavoidably contaminated from raw materials of the steel and/or production processes. In the present electrical steel sheet, the unavoidable impurities are acceptable when they are contained within a range that does not deteriorate the characteristics.

In addition, the present electrical steel sheet may include at least one selected from the group consisting of 0.30% or less of Cr, 0.40% or less of Cu, 0.50% or less of P, 1.00% or less of Ni, 0.30% or less of Sn, 0.30% or less of Sb, and 0.01% or less of Bi, which are in the range that can enhance other characteristics without deteriorating the magnetic characteristics of the silicon steel slab.

Silicon Steel Slab

The present slab (silicon steel slab) is obtained by continuously casting or by ingot-making and blooming the molten steel with the above chemical composition which is made by a converter or an electric furnace and which is subjected to a vacuum degassing treatment as necessary. The silicon steel slab is generally the steel piece whose thickness is 150 to 350 mm and preferably 220 to 280 mm. The silicon steel slab may be the thin slab whose thickness is 30 to 70 mm. In a case of the thin slab, there is an advantage that it is not necessary to conduct the rough processing for controlling the thickness to be an intermediate thickness in order to obtain the hot rolled sheet.

Heating Temperature of Silicon Steel Slab

The silicon steel slab is heated to 1250° C. or less and is subjected to hot rolling. When the heating temperature is more than 1250° C., an amount of melt scale increases, MnS and/or MnSe are completely solid-soluted and are precipitated finely in the subsequent processes, the temperature for decarburization annealing needs to be raised to 900° C. or more in order to obtain the desired grain size after primary recrystallization, which is not preferable. Moreover, the inhibitor which is finely precipitated tends to be ostwald-ripened during decarburization annealing, and as a result, the uniformity (uniformly sizing) of primary recrystallized grain deteriorates. Thereby, the secondary recrystallization becomes unstable, and the magnetic characteristics deteriorate significantly, which is not preferable. The heating temperature is preferably 1200° C. or less.

The lower limit of heating temperature is not particularly limited. In order to secure the workability of silicon steel slab, the heating temperature is preferably 1100° C. or more.

Hot Rolling, Hot Band Annealing

The silicon steel slab heated to 1250° C. or less is subjected to hot rolling in order to obtain the hot rolled steel sheet. The hot rolled steel sheet is heated and recrystallized in 1000 to 1150° C. (first stage temperature), and thereafter, is heated and annealed in 850 to 1100° C. (second stage temperature) which is lower than the first stage temperature, in order to homogenize the nonuniform structure after hot rolling. The hot band annealing is preferably conducted once or more in order to homogenize the hot rolled structure before the hot rolled sheet is subjected to final cold rolling.

In the hot band annealing, the first stage temperature significantly influences the precipitate of inhibitor in the subsequent processes. When the first stage temperature is more than 1150° C., the inhibitor is precipitated finely in the subsequent processes, the temperature for decarburization annealing needs to be raised to 900° C. or more in order to obtain the desired grain size after primary recrystallization, which is not preferable. The first stage temperature is preferably 1120° C. or less.

On the other hand, when the first stage temperature is less than 1000° C., the recrystallization becomes insufficient, the hot rolled structure is not homogenized, which is not preferable. The first stage temperature is preferably 1030° C. or more.

As with the first stage temperature, when the second stage temperature is more than 1100° C., the inhibitor is precipitated finely in the subsequent processes, which is not preferable. On the other hand, when the second stage temperature is less than 850° C., γ phase is not transformed, the hot rolled structure is not homogenized, which is not preferable. The second stage temperature is preferably 880° C. or more.

Cold Rolling

The steel sheet after hot band annealing is cold-rolled once or cold-rolled two times or more times with an intermediate annealing, in order to obtain the steel sheet with final thickness. The cold rolling may be conducted at the room temperature or the temperature higher than the room temperature. For example, the warm rolling may be conducted after the steel sheet is heated to approximately 200° C.

Decarburization Annealing

The steel sheet with final thickness is subjected to decarburization annealing in moist atmosphere, in order to remove C in the steel sheet and to control the primary recrystallized grain to be the desired grain size. For example, it is preferable that the decarburization annealing is conducted in the temperature of 770 to 950° C. for the time such that the grain size after primary recrystallization becomes 15 μm or more.

When the temperature for decarburization annealing is less than 770° C., the desired grain size is not obtained, which is not preferable. The temperature for decarburization annealing is preferably 800° C. or more. On the other hand, when the temperature for decarburization annealing is more than 950° C., the grain size exceeds the desired grain size, which is not preferable. The temperature for decarburization annealing is preferably 920° C. or less.

Nitridation

The steel sheet after decarburization annealing is subjected to nitridation before final annealing, so as to control the N content of steel sheet to be 40 to 1000 ppm. When the N content of steel sheet after nitridation is less than 40 ppm, AlN is not precipitated sufficiently, and does not act as the inhibitor, which is not preferable. The N content of steel sheet after nitridation is preferably 80 ppm or more.

On the other hand, when the N content of steel sheet is more than 1000 ppm, AlN remains excessively after finishing the secondary recrystallization in the following final annealing, the iron loss increases, which is not preferable. The N content of steel sheet after nitridation is preferably 970 ppm or less.

Annealing Separator Applying

The steel sheet after nitridation is applied annealing separator to, and is subjected to final annealing. As the annealing separator, it is possible to use the general annealing separator.

Final Annealing

Secondary Recrystallization Annealing

In the secondary recrystallization annealing of final annealing, since the inhibitor is enhanced by BN, the heating rate in the temperature range of 1000 to 1100° C. is preferably 15° C./hour or less, and more preferably 10° C./hour or less. Instead of controlling the heating rate, the steel sheet may be held in the temperature range of 1000 to 1100° C. for 10 hours or more.

Purification Annealing

The steel sheet after secondary recrystallization annealing is subjected to purification annealing which is followed the secondary recrystallization annealing. By conducting the purification annealing for the steel sheet after finishing secondary recrystallization, the precipitates which have been utilized as the inhibitor is made harmless, and the hysteresis loss decreases as the magnetic characteristics of final product, which is preferable. The atmosphere of purification annealing is not particularly limited, but may be the hydrogen atmosphere for example. Moreover, the purification annealing is conducted in the temperature of approximately 1200° C. for 10 to 30 hours. Although the temperature of purification annealing is approximately 1200° C., the temperature thereof is not particularly limited. The temperature of purification annealing is preferably 1180 to 1220° C. from the productivity standpoint. When the temperature of purification annealing is 1180° C. or less, it takes excessively the time for diffusing the elements, the annealing time needs to be prolonged, which is not preferable. On the other hand, when the temperature of purification annealing is 1220° C. or more, maintenance (durability) of annealing furnace becomes difficult.

Cooling Condition

The steel sheet after purification annealing is cooled under the predetermined cooling conditions (cooling rate).
In order to control the average particle size of BN to 50 to 300 nm, the cooling rate in the temperature range of 1200 to 1000° C. is to be less than 50° C./hour. In addition, the cooling rate in the temperature range of 1000 to 600° C. is to be less than 30° C./hour.
The reason for controlling the cooling rate as described above is as follows.
BN is dissolved into the solid soluted B and solid soluted N in the high temperature region, and N which is not solid-soluted is released into the atmosphere during cooling. On the other hand, B which is not solid-soluted is not released outside the system during cooling, and is precipitated as the B compound such as BN, $Fe_2B$, or $Fe_3B$ inside the glass film or the base steel sheet. In a case where the solid soluted N does not exist sufficiently in the base steel sheet, BN does not precipitate, but $Fe_2B$ or $Fe_3B$ precipitates.
When the cooling rate is appropriate during cooling from the high temperature region, the solid soluted N is released outside the system, and $Fe_2B$ or $Fe_3B$ precipitates in the base steel sheet. Moreover, the precipitated $Fe_2B$ or $Fe_3B$ is ostwald-ripened and coarsened. The solid soluted B in the glass film bonds to N included in the atmosphere, and then the fine BN is precipitated in the glass film.
When the cooling rate is fast, the solid soluted N is not released outside the system, BN is finely precipitated in the steel sheet, and $Fe_2B$ or $Fe_3B$ is not ostwald-ripened and is finely precipitated. Under the above condition, the solid soluted B in the glass film bonds to N included in the atmosphere, and then the fine BN is precipitated in the glass film. However, BN which is finely precipitated in the base steel sheet causes the increase in the hysteresis loss and in the iron loss of final product.
When the cooling rate is less than 10° C./hour, the productivity is significantly affected. Thus, the cooling rate is preferably 10° C./hour or more. In other words, the cooling rate in the temperature range of 1200 to 1000° C. is preferably 10 to 50° C./hour, and the cooling rate in the temperature range of 1000 to 600° C. is preferably 10 to 30° C./hour.
The atmosphere during cooling is preferably 100% of $H_2$ in the temperature range of at least 1200 to 600° C., and 100% of $N_2$ in the temperature range of less than 600° C.
When the atmosphere during cooling is 100% of $N_2$ in the temperature range of 1200 to 600° C., the steel sheet is nitrided during cooling, and the formation of nitrides causes the deterioration of hysteresis loss, which is not preferable. Ar may be substituted for $H_2$ during cooling in the temperature range of 1200 to 600° C., which is not preferable from an economic standpoint.

Magnetic Domain Refining Treatment

The grain oriented electrical steel sheet after final annealing may be subjected to magnetic domain refining treatment. By the magnetic domain refining treatment, the grooves are made, the width of magnetic domain decreases, and as a result, the iron loss decreases, which is preferable. The specific method of magnetic domain refining treatment is not particularly limited, but may be the groove making such as laser irradiation, electron beam irradiation, etching, and toothed gear.
Although it is preferable that the magnetic domain refining treatment is conducted after final annealing, the magnetic domain refining treatment may be conducted before final annealing or after forming the insulation coating.

Insulation Coating Forming

The insulation coating is formed by applying and baking the solution for forming the insulation coating to the surface of steel sheet after secondary recrystallization or after purification annealing. The type of insulation coating is not particularly limited, but may be the conventionally known insulating coating. For example, the insulation coating may be formed by applying the aqueous solution including phosphate and colloidal silica.
The above phosphate is preferably the phosphate of Ca, Al, Sr, and the like, for example. Among these, aluminum phosphate is more preferable. The type of colloidal silica is not particularly limited, and the particle size thereof (mean number diameter) may be appropriately selected. However, when the particle size thereof is more than 200 nm, the particles may settle in the solution. Thus, the particle size (mean number diameter) of colloidal silica is preferably 200 nm or less, and more preferably 170 nm.
When the particle size of colloidal silica is less than 100 nm, although the dispersion is not affected, the production cost increases. Thus, the particle size of colloidal silica is preferably 100 nm or more, more preferably 150 nm or more from an economic standpoint.
The insulating film is formed by the following. For example, the solution for forming the insulation coating is applied to the surface of steel sheet by the wet applying method such as roll coater, and is baked in 800 to 900° C. for 10 to 60 seconds in air atmosphere.

EXAMPLES

Hereinafter, the examples of the present invention are explained. However, the condition in the examples is an example condition employed to confirm the operability and the effects of the present invention, so that the present invention is not limited to the example condition. The present invention can employ various types of conditions as long as the conditions do not depart from the scope of the present invention and can achieve the object of the present invention.

Example 1

The steel slab whose chemical composition was shown in Table 1-1 was heated to 1150° C. The steel slab was hot-rolled to obtain the hot rolled steel sheet whose thickness was 2.6 mm. The hot rolled steel sheet was subjected to the hot band annealing in which the hot rolled steel sheet was annealed at 1100° C. and then annealed at 900° C. The steel sheet after hot band annealing was cold-rolled once or cold-rolled plural times with the intermediate annealing to obtain the cold rolled steel sheet whose thickness was 0.22 mm.

TABLE 1-1

| | SLAB No. | CHEMICAL COMPOSITION (mass %) | | | | | | | | |
|---|---|---|---|---|---|---|---|---|---|---|
| | | C | Si | Mn | Al | N | S | Se | Seq | B |
| INVENTIVE EXAMPLE | A1 | 0.08 | 3.45 | 0.10 | 0.0275 | 0.0082 | 0.0065 | 0 | 0.0065 | 0.0015 |
| | A2 | 0.07 | 1.89 | 0.10 | 0.0285 | 0.0091 | 0.0062 | 0 | 0.0062 | 0.0020 |
| | A3 | 0.04 | 6.52 | 0.10 | 0.0290 | 0.0086 | 0.0055 | 0.001 | 0.0065 | 0.0018 |
| | A4 | 0.07 | 3.45 | 0.08 | 0.0277 | 0.0081 | 0.0062 | 0.001 | 0.0072 | 0.0019 |
| | A5 | 0.05 | 3.33 | 0.80 | 0.0288 | 0.0079 | 0.0065 | 0 | 0.0065 | 0.0021 |
| | A6 | 0.06 | 4.52 | 0.12 | 0.0200 | 0.0077 | 0.0071 | 0 | 0.0071 | 0.0016 |
| | A7 | 0.08 | 3.12 | 0.09 | 0.0550 | 0.0083 | 0.0068 | 0 | 0.0068 | 0.0017 |
| | A8 | 0.05 | 2.81 | 0.09 | 0.0299 | 0.0052 | 0.0069 | 0 | 0.0069 | 0.0018 |
| | A9 | 0.07 | 3.12 | 0.11 | 0.0295 | 0.0110 | 0.0072 | 0 | 0.0072 | 0.0019 |
| | A10 | 0.05 | 2.92 | 0.13 | 0.0299 | 0.0088 | 0.0031 | 0.002 | 0.0051 | 0.0021 |
| | A11 | 0.05 | 3.45 | 0.12 | 0.0275 | 0.0089 | 0.0061 | 0.008 | 0.0141 | 0.0022 |
| | A12 | 0.06 | 3.44 | 0.10 | 0.0266 | 0.0091 | 0.0065 | 0 | 0.0065 | 0.0006 |
| | A13 | 0.07 | 4.21 | 0.10 | 0.0271 | 0.0092 | 0.0072 | 0 | 0.0072 | 0.0078 |
| | A14 | 0.06 | 3.45 | 0.10 | 0.0310 | 0.0091 | 0.0072 | 0 | 0.0072 | 0.0025 |
| | A15 | 0.06 | 3.35 | 0.10 | 0.0299 | 0.0092 | 0.0056 | 0 | 0.0056 | 0.0017 |
| COMPARATIVE EXAMPLE | a1 | 0.15 | 3.45 | 0.12 | 0.0285 | 0.0082 | 0.0065 | 0 | 0.0065 | 0.0002 |
| | a2 | 0.06 | 0.50 | 0.08 | 0.0275 | 0.0091 | 0.0067 | 0 | 0.0067 | 0.0004 |
| | a3 | 0.05 | 8.00 | 0.09 | 0.0277 | 0.0099 | 0.0068 | 0 | 0.0068 | 0.0004 |
| | a4 | 0.04 | 3.45 | 0.04 | 0.0291 | 0.0068 | 0.0088 | 0.001 | 0.0098 | 0.0002 |
| | a5 | 0.07 | 3.35 | 1.21 | 0.0288 | 0.0088 | 0.0091 | 0.002 | 0.0111 | 0.0006 |
| | a6 | 0.05 | 3.25 | 0.08 | 0.0050 | 0.0071 | 0.0062 | 0.003 | 0.0092 | 0.0007 |
| | a7 | 0.06 | 3.12 | 0.07 | 0.0820 | 0.0089 | 0.0059 | 0 | 0.0059 | 0.0009 |
| | a8 | 0.05 | 3.45 | 0.10 | 0.0265 | 0.0152 | 0.0091 | 0.001 | 0.0101 | 0.0003 |
| | a9 | 0.05 | 3.15 | 0.08 | 0.0258 | 0.0082 | 0.0100 | 0.01 | 0.0200 | 0.0002 |
| | a10 | 0.06 | 3.28 | 0.10 | 0.0266 | 0.0089 | 0.0065 | 0.0001 | 0.0066 | 0.0003 |
| | a11 | 0.05 | 3.19 | 0.13 | 0.0277 | 0.0085 | 0.0067 | 0 | 0.0067 | 0.0152 |

The cold rolled steel sheet with final thickness of 0.22 mm was subjected to the decarburization annealing in which the soaking was conducted at 860° C. in moist atmosphere. The nitridation (annealing to increase the nitrogen content of steel sheet) was conducted for the steel sheet after decarburization annealing. The annealing separator which included magnesia as the main component was applied to the steel sheet after nitridation, and then the steel sheet was held at 1200° C. for 20 hours in hydrogen gas atmosphere. The steel sheet after being held was cooled by 40° C./hour in the temperature range of 1200 to 1000° C. and by 20° C./hour in the temperature range of 1000 to 600° C. At the time, the atmosphere during cooling was 100% of $H_2$ in the temperature range of 1200 to 600° C. and 100% of $N_2$ in the temperature range of less than 600° C.

The excess magnesia was removed from the steel sheet after being annealed, and then, the insulation coating which included phosphate and colloidal silica as main components was formed on the forsterite film to obtain the final product.

The chemical composition of the base steel sheet in the product is shown in Table 1-2. Herein, A1 to A15 and a1 to a11 in Table 1-1 indicate the slab number, and A1 to A15 and a1 to a11 in Table 1-2 indicate the base steel sheet number. For example, the base steel sheet A1 was produced from the slab A1.

TABLE 1-2

| | STEEL No. | CHEMICAL COMPOSITION (mass %) | | | | | | | | |
|---|---|---|---|---|---|---|---|---|---|---|
| | | C | Si | Mn | Al | N | S | Se | Seq | B |
| INVENTIVE EXAMPLE | A1 | 0.002 | 3.45 | 0.10 | 0.0275 | 0.0032 | 0.0020 | 0 | 0.0020 | 0.0015 |
| | A2 | 0.001 | 1.89 | 0.10 | 0.0285 | 0.0021 | 0.0021 | 0 | 0.0021 | 0.0020 |
| | A3 | 0.002 | 6.52 | 0.10 | 0.0290 | 0.0016 | 0.0022 | 0.001 | 0.0032 | 0.0018 |
| | A4 | 0.003 | 3.45 | 0.08 | 0.0277 | 0.0029 | 0.0025 | 0.001 | 0.0035 | 0.0019 |
| | A5 | 0.003 | 3.33 | 0.80 | 0.0288 | 0.0028 | 0.0030 | 0 | 0.0030 | 0.0021 |
| | A6 | 0.002 | 4.52 | 0.12 | 0.0200 | 0.0023 | 0.0011 | 0 | 0.0011 | 0.0016 |
| | A7 | 0.001 | 3.12 | 0.09 | 0.0550 | 0.0022 | 0.0012 | 0 | 0.0012 | 0.0017 |
| | A8 | 0.002 | 2.81 | 0.09 | 0.0299 | 0.0019 | 0.0021 | 0 | 0.0021 | 0.0018 |
| | A9 | 0.001 | 3.12 | 0.11 | 0.0295 | 0.0039 | 0.0022 | 0 | 0.0022 | 0.0019 |
| | A10 | 0.002 | 2.92 | 0.13 | 0.0299 | 0.0038 | 0.0031 | 0.002 | 0.0051 | 0.0021 |
| | A11 | 0.002 | 3.45 | 0.12 | 0.0275 | 0.0033 | 0.0016 | 0.008 | 0.0096 | 0.0022 |
| | A12 | 0.001 | 3.44 | 0.10 | 0.0266 | 0.0021 | 0.0017 | 0 | 0.0017 | 0.0006 |
| | A13 | 0.003 | 4.21 | 0.10 | 0.0271 | 0.0029 | 0.0021 | 0 | 0.0021 | 0.0078 |
| | A14 | 0.002 | 3.45 | 0.10 | 0.0310 | 0.003 | 0.0022 | 0 | 0.0022 | 0.0025 |
| | A15 | 0.001 | 3.35 | 0.10 | 0.0299 | 0.0012 | 0.0033 | 0 | 0.0033 | 0.0017 |
| COMPARATIVE EXAMPLE | a1 | 0.15 | 3.45 | 0.12 | 0.0285 | 0.0082 | 0.0065 | 0 | 0.0065 | 0.0002 |
| | a2 | 0.06 | 0.5 | 0.08 | 0.0275 | 0.0091 | 0.0067 | 0 | 0.0067 | 0.0004 |
| | a3 | 0.05 | 8 | 0.09 | 0.0277 | 0.0099 | 0.0068 | 0 | 0.0068 | 0.0004 |
| | a4 | 0.04 | 3.45 | 0.04 | 0.0291 | 0.0068 | 0.0088 | 0.001 | 0.0098 | 0.0002 |
| | a5 | 0.07 | 3.35 | 1.21 | 0.0288 | 0.0088 | 0.0091 | 0.002 | 0.0111 | 0.0006 |
| | a6 | 0.05 | 3.25 | 0.08 | 0.0050 | 0.0071 | 0.0062 | 0.003 | 0.0092 | 0.0007 |
| | a7 | 0.06 | 3.12 | 0.07 | 0.0820 | 0.0089 | 0.0059 | 0 | 0.0059 | 0.0009 |
| | a8 | 0.05 | 3.45 | 0.10 | 0.0265 | 0.0152 | 0.0091 | 0.001 | 0.0101 | 0.0003 |
| | a9 | 0.05 | 3.15 | 0.08 | 0.0258 | 0.0082 | 0.01 | 0.01 | 0.0200 | 0.0002 |

TABLE 1-2-continued

| STEEL No. | C | Si | Mn | Al | N | S | Se | Seq | B |
|---|---|---|---|---|---|---|---|---|---|
| a10 | 0.06 | 3.28 | 0.10 | 0.0266 | 0.0089 | 0.0065 | 0.0001 | 0.0066 | 0.0003 |
| a11 | 0.05 | 3.19 | 0.13 | 0.0277 | 0.0085 | 0.0067 | 0 | 0.0067 | 0.0152 |

The magnetic domain of the product after forming insulation coating was controlled by mechanical treatment, laser irradiation, electron beam irradiation, and the like.

Precipitates

The inside of the glass film on C section of steel sheet (namely, a region which was from an outermost surface of the glass film (an interface between the glass film and the insulation coating) till 5 μm toward the base steel sheet in a depth direction) was observed by SEM-EDS, the B compound therein was observed in 10 visual fields in which each visual field was 4 μm in the width direction and 2 μm in the thickness direction, BN was identified by EDS, the major axis of the identified BN was measured and converted into equivalent circle diameter, and then the particle size of precipitate was determined. Based on the particle size of each precipitate determined above, the number density of BN with the particle size of 50 to 300 nm and the average particle size of BN were obtained.

The existence of BN precipitate and the average particle size of BN are shown in Table 2.

Number Density of BN

Before measuring the number density of BN, the insulating coating was removed using sodium hydroxide from the grain oriented electrical steel sheet produced by the above method. The region from the outermost surface of the glass film till 5 μm on the cross section perpendicular to the rolling direction of the steel sheet was observed by SEM, and the number of BN with the particle size of 50 to 300 nm was counted in 10 visual fields in which each visual field was 4 μm in the width direction and 2 μm in the thickness direction.

The number density of BN is shown in Table 2.

B Emission Intensity

The B emission intensity $I_B$ was measured by the glow discharge emission spectroscopy (GDS). When a sputtering time to reach the glass film from the measurement start was referred to as t (glass) and a sputtering time to reach the base steel sheet from the measurement start was referred to as t (Fe) in a case where the B emission intensity was measured by the glow discharge emission spectroscopy from the outermost surface of the steel sheet without the insulation coating, the B emission intensity $I_{B\_t(glass)}$ in the t (glass) and the B emission intensity $I_{B\_t(Fe)}$ in the t (Fe) were determined. The $I_{B\_t(glass)}/I_{B\_t(Fe)}$ which is the ratio thereof is shown in Table 2. Herein, the steel sheet which satisfied $I_{B\_t(glass)}/I_{B\_t(Fe)} > 1$ was judged to be acceptable.

The t (glass) and the t (Fe) were determined by the emission intensities of Al and Fe of GDS. Specifically, the Al peak observed in the insulation coating was referred to as the Al first peak, the Al peak observed in the glass film was referred to as the Al second peak, and the time at which the Al emission intensity became maximum in the Al second peak was defined as the t (glass). The time at which the Fe emission intensity became constant was defined as t (Fe). Herein, the above "the Fe emission intensity became constant" did not indicate the time at which the Fe emission intensity started to become constant, but indicated the time at which the Fe emission intensity became constant and stable. Specifically, the above "the Fe emission intensity became constant" was judged whether or not the change of the Fe emission intensity was within 0.5 per 50 seconds. When the above change became within 0.5, the end time of the 50 seconds thereat was defined as t (Fe).

Coating Adhesion

The coating adhesion was evaluated as follows. The insulation coating was formed on the glass film after final annealing, the steel sheet was rolled around a round bar with plural diameters (20 mm, 10 mm, 5 mm), and the coating adhesion was evaluated by the area fraction of delaminated coating in each diameter. The area fraction of delaminated coating was the ratio of the actual delaminated area to the deformed area (the area where the steel sheet was contacted with the round bar, which corresponded to the width of test piece×the diameter of the round bar×π). Even if the insulation coating delaminated by severe bending, if the delamination did not propagate and the area fraction of delaminated coating was small, the deterioration of transformer characteristics was judged to be small.

The coating adhesion was evaluated with 7 grades of A to G, wherein A was 0% of the area fraction of delaminated coating, B was more than 0% to less than 20%, C was more than 20% to less than 40%, D was more than 40% to less than 60%, E was more than 60% to less than 80%, F was more than 80% to less than 100%, and G was 100%. The coating adhesion with B grade or higher was judged to be acceptable.

Magnetic Characteristics

Magnetic Flux Density $B_8$

As to the grain oriented electrical steel sheet obtained by the above producing method, the magnetic flux density $B_8$ (magnetic flux density magnetized in 800 A/m) was measured by the single sheet tester (SST) method.

Iron Loss $W_{17/50}$ ×Iron Loss $W_{17/50}$ after Controlling the Magnetic Domain The test pieces (for example, test piece of 100 mm×500 mm) were taken from the grain oriented electrical steel sheets before controlling the magnetic domain and after controlling the magnetic domain, and then, the iron loss $W_{17/50}$ (unit: W/kg) which was the energy loss per unit weight was measured under excitation conditions such as a magnetic flux density of 1.7 T and a frequency of 50 Hz.

Except for some examples, the magnetic domain controlling was conducted after forming the insulation coating. As described later, in some examples, the magnetic domain controlling was conducted before forming the insulation coating (it may be referred to as intermediate process).

The precipitation state of BN, the B emission intensity, the evaluation results of the coating adhesion, and the magnetic characteristics of the grain oriented electrical steel sheet (final product) are shown in Table 2. In the inventive examples B1 to B15 within the scope of the present invention, the grain oriented electrical steel sheets with excellent coating adhesion and excellent magnetic characteristics were obtained. In the comparative examples b1 to b11 without the scope of the present invention, the coating adhesion and the magnetic characteristics were insufficient.

TABLE 2

| | No. | STEEL No. | EXISTENCE OF BN PRECIPITATE | NUMBER DENSITY (pieces/mm$^3$) | AVERAGE PARTICLE SIZE (nm) | $I_{B\_t(glass)}/I_{B\_t(Fe)}$ |
|---|---|---|---|---|---|---|
| INVENTIVE EXAMPLE | B1 | A1 | EXISTENCE | $2 \times 10^6$ | 120 | 18 |
| | B2 | A2 | EXISTENCE | $2 \times 10^7$ | 280 | 21 |
| | B3 | A3 | EXISTENCE | $3 \times 10^6$ | 250 | 22 |
| | B4 | A4 | EXISTENCE | $8 \times 10^6$ | 220 | 23 |
| | B5 | A5 | EXISTENCE | $4 \times 10^6$ | 200 | 22 |
| | B6 | A6 | EXISTENCE | $2 \times 10^6$ | 190 | 17 |
| | B7 | A7 | EXISTENCE | $3 \times 10^6$ | 90 | 19 |
| | B8 | A8 | EXISTENCE | $8 \times 10^6$ | 70 | 22 |
| | B9 | A9 | EXISTENCE | $7 \times 10^6$ | 50 | 19 |
| | B10 | A10 | EXISTENCE | $5 \times 10^6$ | 120 | 15 |
| | B11 | A11 | EXISTENCE | $2 \times 10^6$ | 290 | 12 |
| | B12 | A12 | EXISTENCE | $5 \times 10^6$ | 160 | 31 |
| | B13 | A13 | EXISTENCE | $2 \times 10^6$ | 60 | 33 |
| | B14 | A14 | EXISTENCE | $2 \times 10^{10}$ | 200 | 16 |
| | B15 | A15 | EXISTENCE | $1 \times 10^{10}$ | 210 | 21 |
| COMPARATIVE EXAMPLE | b1 | a1 | NONE | — | — | 11 |
| | b2 | a2 | NONE | — | — | 0.5 |
| | b3 | a3 | NONE | — | — | 0.3 |
| | b4 | a4 | NONE | — | — | 0.9 |
| | b5 | a5 | NONE | — | — | 0.9 |
| | b6 | a6 | NONE | — | — | 0.8 |
| | b7 | a7 | NONE | — | — | 0.9 |
| | b8 | a8 | NONE | — | — | 0.9 |
| | b9 | a9 | NONE | — | — | 0.9 |
| | b10 | a10 | NONE | — | — | 0.9 |
| | b11 | a11 | NONE | — | — | 31 |

| | COATING ADHESION | | | MAGNETIC CHARACTERISTICS | | |
|---|---|---|---|---|---|---|
| | | | | MAGNETIC FLUX DENSITY | IRON LOSS $W_{17/50}$ | IRON LOSS AFTER CONTROLLING MAGNETIC DOMAIN $W_{17/50}$ |
| | 20 mm φ | 10 mm φ | 5 mm φ | $B_8$ (T) | (W/kg) | (W/kg) |
| INVENTIVE EXAMPLE | A | A | B | 1.923 | 0.82 | 0.67 |
| | A | A | B | 1.924 | 0.81 | 0.69 |
| | A | B | B | 1.930 | 0.82 | 0.71 |
| | A | A | B | 1.929 | 0.83 | 0.69 |
| | A | B | B | 1.921 | 0.80 | 0.68 |
| | A | A | B | 1.925 | 0.84 | 0.67 |
| | A | B | B | 1.933 | 0.82 | 0.68 |
| | A | A | B | 1.928 | 0.81 | 0.65 |
| | A | A | B | 1.928 | 0.82 | 0.66 |
| | A | B | B | 1.924 | 0.82 | 0.67 |
| | A | A | B | 1.922 | 0.80 | 0.69 |
| | A | B | B | 1.926 | 0.84 | 0.70 |
| | A | A | B | 1.933 | 0.81 | 0.69 |
| | A | A | B | 1.921 | 0.79 | 0.69 |
| | A | A | B | 1.931 | 0.80 | 0.65 |
| COMPARATIVE EXAMPLE | D | E | G | 1.922 | 0.90 | 0.81 |
| | D | E | G | 1.921 | 0.92 | 0.83 |
| | E | F | G | 1.922 | 0.94 | 0.85 |
| | E | F | G | 1.925 | 0.92 | 0.83 |
| | G | G | G | 1.922 | 0.94 | 0.85 |
| | G | G | G | 1.924 | 0.91 | 0.82 |
| | C | D | G | 1.923 | 0.89 | 0.80 |
| | C | D | G | 1.921 | 0.89 | 0.80 |
| | C | D | G | 1.929 | 0.99 | 0.89 |
| | B | C | C | 1.899 | 1.01 | 0.91 |
| | E | F | G | 1.923 | 0.91 | 0.82 |

Example 2

The grain oriented electrical steel sheet (final product) was produced by the same method as in Example 1. For controlling the magnetic domain, mechanical treatment, laser irradiation, electron beam irradiation, and the like were conducted for the product.

The precipitation state of BN, the B emission intensity, and the evaluation of various characteristics were evaluated by the same method as in Example 1.

The precipitation state of BN, the B emission intensity, the evaluation results of the coating adhesion, and the magnetic characteristics of the grain oriented electrical steel sheet (final product) are shown in Table 3. In the inventive examples C1 to C5 within the scope of the present invention, the grain oriented electrical steel sheets with excellent coating adhesion and excellent magnetic characteristics were obtained.

In D6, the magnetic domain controlling was conducted before final annealing. In D7, the magnetic domain controlling was conducted after final annealing and before forming the insulation coating. Except for the above conditions, D6 and D7 were produced by the same producing method of D1 to D5.

In d1, the annealing separator was applied, and then, the annealing was conducted at 1200° C. for 3 hours in hydrogen gas atmosphere. In d2, the annealing separator was applied, and then, the annealing was conducted at 1200° C. for 5 hours in hydrogen gas atmosphere. In d3, the steel sheet was held at 1200° C. for 20 hours, was cooled by 60° C./hour in the temperature range of 1200 to 1000° C., and then, was cooled by 20° C./hour in the temperature range of 1000 to 600° C. In d4, the steel sheet was held at 1200° C. for 20 hours, was cooled by 40° C./hour in the temperature range of 1200 to 1000° C., and then, was cooled by 40° C./hour in the temperature range of 1000 to 600° C.

TABLE 3

|  | No. | STEEL No. | EXISTENCE OF BN PRECIPITATE | NUMBER DENSITY (pieces/mm³) | AVERAGE PARTICLE SIZE (nm) | $I_{B\_t(glass)}/I_{B\_t(Fe)}$ | COATING ADHESION 20 mm φ | 10 mm φ |
|---|---|---|---|---|---|---|---|---|
| INVENTIVE EXAMPLE | C1 | A1 | EXISTENCE | $2 \times 10^6$ | 100 | 19 | A | A |
|  | C2 | A2 | EXISTENCE | $5 \times 10^6$ | 150 | 12 | A | A |
|  | C3 | A3 | EXISTENCE | $4 \times 10^6$ | 150 | 21 | A | A |
|  | C4 | A4 | EXISTENCE | $3 \times 10^6$ | 100 | 18 | A | A |
|  | C5 | A5 | EXISTENCE | $4 \times 10^6$ | 80 | 15 | A | A |

|  | COATING ADHESION 5 mm φ | MAGNETIC FLUX DENSITY $B_8$ (T) | IRON LOSS $W_{17/50}$ (W/kg) | IRON LOSS AFTER CONTROLLING MAGNETIC DOMAIN $W_{17/50}$ (W/kg) | METHOD FOR CONTROLLING MAGNETIC DOMAIN |
|---|---|---|---|---|---|
| INVENTIVE EXAMPLE | B | 1.925 | 0.82 | 0.67 | LASER |
|  | B | 1.925 | 0.80 | 0.68 | LASER |
|  | B | 1.931 | 0.82 | 0.71 | TOOTHED GEAR |
|  | B | 1.930 | 0.82 | 0.68 | ELECTRON BEAM |
|  | B | 1.922 | 0.80 | 0.68 | ELECTRON BEAM |

Example 3

The grain oriented electrical steel sheet (final product) was produced by the same method as in Example 1. For controlling the magnetic domain, mechanical treatment, laser irradiation, electron beam irradiation, and the like were conducted for the product.

Except for the above conditions, d1 to d4 were produced by the same producing method of D1 to D5.

For the grain oriented steel sheet (product), the precipitation state of BN, the $I_{B\_t(glass)}$ and the $I_{B\_t(Fe)}$, the coating adhesion, and the magnetic characteristics were evaluated. These results are shown in Table 4.

TABLE 4

|  | No. | STEEL No. | EXISTENCE OF BN PRECIPITATE | NUMBER DENSITY (pieces/mm³) | AVERAGE PARTICLE SIZE (nm) | $I_{B\_t(glass)}/I_{B\_t(Fe)}$ | COATING ADHESION 20 mm φ | 10 mm φ |
|---|---|---|---|---|---|---|---|---|
| INVENTIVE EXAMPLE | D1 | A6 | EXISTENCE | $2 \times 10^6$ | 150 | 20 | A | A |
|  | D2 | A7 | EXISTENCE | $5 \times 10^6$ | 100 | 11 | A | A |
|  | D3 | A8 | EXISTENCE | $3 \times 10^6$ | 80 | 6 | A | A |
|  | D4 | A9 | EXISTENCE | $3 \times 10^6$ | 90 | 11 | A | A |
|  | D5 | A10 | EXISTENCE | $3 \times 10^6$ | 200 | 15 | A | A |
|  | D6 | A11 | EXISTENCE | $3 \times 10^6$ | 120 | 24 | A | A |
|  | D7 | A12 | EXISTENCE | $6 \times 10^6$ | 200 | 22 | A | A |
| COMPARATIVE EXAMPLE | d1 | A8 | EXISTENCE | $2 \times 10^3$ | 210 | 10 | D | D |
|  | d2 | A9 | EXISTENCE | $5 \times 10^2$ | 200 | 11 | C | D |
|  | d3 | A10 | EXISTENCE | $3 \times 10^{11}$ | 30 | 21 | A | A |
|  | d4 | A12 | EXISTENCE | $2 \times 10^{11}$ | 40 | 22 | A | A |

TABLE 4-continued

| | | COATING ADHESION 5 mm φ | MAGNETIC CHARACTERISTICS | | | |
|---|---|---|---|---|---|---|
| | | | MAGNETIC FLUX DENSITY $B_8$ (T) | IRON LOSS $W_{17/50}$ (W/kg) | IRON LOSS AFTER CONTROLLING MAGNETIC DOMAIN $W_{17/50}$ (W/kg) | METHOD FOR CONTROLLING MAGNETIC DOMAIN |
| INVENTIVE EXAMPLE | | B | 1.926 | 0.81 | 0.67 | LASER |
| | | B | 1.926 | 0.81 | 0.67 | LASER |
| | | B | 1.931 | 0.81 | 0.70 | TOOTHED GEAR |
| | | B | 1.931 | 0.81 | 0.68 | ELECTRON BEAM |
| | | B | 1.923 | 0.79 | 0.68 | ELECTRON BEAM |
| | | B | 1.922 | 0.68 | — | LASER BEFOR FINAL ANNEALING |
| | | B | 1.931 | 0.67 | — | LASER AFTER FINAL ANNEALING |
| COMPARATIVE EXAMPLE | | E | 1.931 | 0.98 | 0.79 | TOOTHED GEAR |
| | | E | 1.933 | 0.99 | 0.78 | TOOTHED GEAR |
| | | B | 1.931 | 0.88 | 0.75 | LASER |
| | | B | 1.933 | 0.87 | 0.76 | TOOTHED GEAR |

In the inventive examples D1 to D7 in which the B emission intensity $I_{B\_t(glass)}$ in the surface region of the steel sheet and the B emission intensity $I_{B\_t(Fe)}$ in the center region of the steel sheet satisfied the above expression (1), the coating adhesion and the magnetic characteristics were excellent. On the other hand, in d1 to d4 in which any production condition was out of the range described above, at least one of the coating adhesion and the magnetic characteristics were insufficient.

Herein, in D6 and D7, since the magnetic domain was controlled in the intermediate process, unlike other inventive examples and comparative examples, the iron loss $W_{17/50}$ was measured only once. Thus, in Table 4, the field of "iron loss after controlling magnetic domain" thereof is shown as "–".

INDUSTRIAL APPLICABILITY

According to the above aspects of the present invention, it is possible to stably provide the grain oriented electrical steel sheet which is excellent in the coating adhesion, the iron loss, and the productivity of the wound iron core, and which can suppresses the delamination of the primary coating at a region where the steel sheet is severely bended on the inner circumference of iron core, in the grain oriented electrical steel sheet which utilizes BN as the inhibitor. Accordingly, the present invention has the applicability for the industrial field of the grain oriented electrical steel sheet.

What is claimed is:

1. A grain oriented electrical steel sheet comprising:
   a base steel sheet;
   a glass film which is arranged in contact with the base steel sheet; and
   an insulation coating which is arranged in contact with the glass film and which includes a phosphate and a colloidal silica as main components,
   wherein
   the base steel sheet includes: as a chemical composition, by mass %,
   0.085% or less of C;
   0.80 to 7.00% of Si;
   0.05 to 1.00% of Mn;
   0.010 to 0.065% of acid soluble Al;
   0.012% or less of N;
   0.015% or less of Seq=S+0.406·Se;
   0.0005 to 0.0080% of B; and
   a balance consisting of Fe and impurities,
   a BN whose average particle size is 50 to 300 nm and whose number density is $2 \times 10^6$ to $2 \times 10^{10}$ pieces/mm$^3$ is included in a region which is from an interface between the glass film and the insulation coating till 5 μm toward the base steel sheet in a depth direction, and
   a B emission intensity obtained inside the glass film is more than a B emission intensity obtained inside the base steel sheet, when a B emission intensity is measured from a surface of the insulation coating by a glow discharge emission spectroscopy.

2. The grain oriented electrical steel sheet according to claim 1, wherein
   when an Al emission intensity and an Fe emission intensity are measured by the glow discharge emission spectroscopy, when two peaks observed on an utmost side toward the insulating coating among peaks of the Al emission intensity are referred to as an Al first peak and an Al second peak in turn from the utmost side, when a sputtering time at which the Al second peak is obtained is referred to as t(glass), when a sputtering time at which the Fe emission intensity becomes constant is referred to as t(Fe), when a B emission intensity in the t (glass) is referred to as $I_{B\_t(glass)}$, and when a B emission intensity in the t(Fe) is referred to as $I_{B\_t\ (Fe)}$, the $I_{B\_t(glass)}$ and the $I_{B\_t(Fe)}$ satisfy a following expression (1), $$I_{B\_t(glass)} > I_{B\_t(Fe)} \qquad (1).$$

3. The grain oriented electrical steel sheet according to claim 1 or 2, wherein
   a ratio of a major axis to a minor axis of the BN is 1.5 or less.

4. The grain oriented electrical steel sheet according to claim 2, wherein a ratio of a major axis to a minor axis of the BN is 1.5 or less.

5. A grain oriented electrical steel sheet comprising:
   a base steel sheet;
   a glass film which is arranged in contact with the base steel sheet; and
   an insulation coating which is arranged in contact with the glass film and which includes a phosphate and a colloidal silica as main components, wherein
the base steel sheet includes: as a chemical composition, by mass %,
0.085% or less of C;
0.80 to 7.00% of Si;
0.05 to 1.00% of Mn;
0.010 to 0.065% of acid soluble Al;
0.012% or less of N;
0.015% or less of Seq=S+0.406·Se;
0.0005 to 0.0080% of B; and
a balance comprising Fe and impurities,
a BN whose average particle size is 50 to 300 nm and whose number density is $2\times10^6$ to $2\times10^{10}$ pieces/mm$^3$ is included in a region which is from an interface between the glass film and the insulation coating till 5 μm toward the base steel sheet in a depth direction, and
a B emission intensity obtained inside the glass film is more than a B emission intensity obtained inside the base steel sheet, when a B emission intensity is measured from a surface of the insulation coating by a glow discharge emission spectroscopy.

\* \* \* \* \*